United States Patent
Song (10) Patent No.: US 9,918,132 B2
(45) Date of Patent: Mar. 13, 2018

(54) PATTERN CODE RECOGNITION MULTIMEDIA PLAYBACK APPARATUS, AND METHOD FOR DRIVING SAME

(71) Applicant: Min-woo Song, Seoul (KR)

(72) Inventor: Min-woo Song, Seoul (KR)

(73) Assignee: ENGLISHEGG CO., LTD (KR)

( * ) Notice: Subject to any disclaimer, the term of this patent is extended or adjusted under 35 U.S.C. 154(b) by 216 days.

(21) Appl. No.: 14/439,587

(22) PCT Filed: Oct. 21, 2013

(86) PCT No.: PCT/KR2013/009391
§ 371 (c)(1),
(2) Date: Jul. 17, 2015

(87) PCT Pub. No.: WO2014/069830
PCT Pub. Date: May 8, 2014

(65) Prior Publication Data
US 2015/0319478 A1    Nov. 5, 2015

(30) Foreign Application Priority Data

Oct. 31, 2012 (KR) .................. 10-2012-0122627

(51) Int. Cl.
*H04N 21/47* (2011.01)
*H04N 21/4788* (2011.01)
(Continued)

(52) U.S. Cl.
CPC ............ *H04N 21/47* (2013.01); *G06F 3/033* (2013.01); *G06F 3/0317* (2013.01);
(Continued)

(58) Field of Classification Search
None
See application file for complete search history.

(56) References Cited

U.S. PATENT DOCUMENTS 7,281,664 B1 * 10/2007 Thaeler ................. G06F 3/0321
                                                                 235/462.46
8,737,908 B1 *  5/2014 Smith .................... G09B 5/062
                                                                 434/317
(Continued)

FOREIGN PATENT DOCUMENTS

CN      201213041 Y      3/2009
CN      101714037 A      5/2010
(Continued)

OTHER PUBLICATIONS

International Search Report (in Korean and English) for PCT/KR2013/009391, dated Jan. 24, 2014; ISA/KR.
(Continued)

*Primary Examiner* — Ricky Chin
(74) *Attorney, Agent, or Firm* — Harness, Dickey & Pierce, P.L.C.

(57) ABSTRACT

The present disclosure describes a sensing technology. A pattern code recognition multimedia playback apparatus and driving method therefor according to some embodiments recognize pattern code by using pattern code recognition pen, extract multimedia data corresponding to the recognized pattern code from pattern code recognition set-top box, and control playback of the multimedia data, thus easily calling multimedia data stored in memory pack attached to the pattern code recognition set-top box with the pattern code recognition pen for recognizing pattern code printed on pattern code-printed material and promptly and easily watching the multimedia data played through display unit. The present disclosure provides various curriculums including animation, storytelling, dancing, and the like, to allow infants or preschool children to easily access contents to learn described in studying materials through the display unit, thus improving learning efficiency of the kids and
(Continued)

assisting intelligence development, personality development, and emotion development.

16 Claims, 6 Drawing Sheets (51) Int. Cl.
| | |
|---|---|
| H04N 21/81 | (2011.01) |
| G06F 3/03 | (2006.01) |
| G06F 3/033 | (2013.01) |
| G06F 3/0488 | (2013.01) |
| H04N 21/418 | (2011.01) |
| H04N 21/4367 | (2011.01) |
| H04N 21/432 | (2011.01) |
| G06K 9/22 | (2006.01) |
| G09B 5/00 | (2006.01) |
| H04N 21/422 | (2011.01) |
| H04N 21/4363 | (2011.01) |

(52) U.S. Cl.
CPC .......... *G06F 3/0321* (2013.01); *G06F 3/0488* (2013.01); *G06K 9/22* (2013.01); *G09B 5/00* (2013.01); *H04N 21/4181* (2013.01); *H04N 21/4184* (2013.01); *H04N 21/42206* (2013.01); *H04N 21/42222* (2013.01); *H04N 21/4325* (2013.01); *H04N 21/4367* (2013.01); *H04N 21/43637* (2013.01); *H04N 21/4788* (2013.01); *H04N 21/8173* (2013.01); *G06F 2203/04807* (2013.01); *G06F 2203/04808* (2013.01)

(56) References Cited

U.S. PATENT DOCUMENTS

| | | | | |
|---|---|---|---|---|
| 2007/0040809 | A1* | 2/2007 | Yeung | G06F 3/011 345/173 |
| 2009/0021493 | A1* | 1/2009 | Marggraff | G06F 3/03545 345/179 |
| 2010/0085325 | A1* | 4/2010 | King-Smith | G06F 3/03545 345/174 |
| 2012/0045745 | A1* | 2/2012 | Lee | G09B 5/06 434/351 |
| 2012/0045746 | A1* | 2/2012 | Lee | G09B 5/02 434/365 |
| 2013/0033461 | A1* | 2/2013 | Silverbrook | G06F 17/241 345/179 |
| 2013/0050101 | A1* | 2/2013 | Lu | G06F 3/0488 345/173 |
| 2013/0212533 | A1* | 8/2013 | Hsieh | G06F 3/04886 715/835 |

FOREIGN PATENT DOCUMENTS

| | | | | |
|---|---|---|---|---|
| KR | 2010-0088058 A | | 8/2010 | |
| KR | 10-2010-0014746 | * | 8/2011 | ............... G06F 3/00 |
| KR | 10-2011-0094981 A | | 8/2011 | |
| KR | 10-2010-0088058 | * | 3/2012 | ............... G09B 5/06 |
| KR | 10-2010-0090712 | * | 3/2012 | ............... H04B 10/00 |
| KR | 10-2012-0025884 A | | 3/2012 | |
| KR | 10-2012-0029026 A | | 3/2012 | |
| KR | 10-2011-0113612 | * | 5/2012 | ............... G09B 5/06 |
| KR | 10-1139993 B1 | | 5/2012 | |

OTHER PUBLICATIONS

International Preliminary Report on Patentability (in English) for PCT/KR2013/009391, dated May 5, 2015.
First Notification of Chinese Office Action dated Jun. 15, 2017 (with English translation) from the State Intellectual Property Office (SIPO) of People's Republic of China regarding Chinese Patent Application No. 201380067641.2 (24 pages).

* cited by examiner

PATTERN CODE RECOGNITION MULTIMEDIA PLAYBACK APPARATUS, AND METHOD FOR DRIVING SAME

TECHNICAL FIELD

The present disclosure relates to a sensing technology. More particularly, present disclosure relates to a pattern code recognition multimedia playback apparatus that recognizes a pattern code by using a pattern code recognition pen, extracts multimedia data corresponding to the pattern code from a pattern code recognition set-top box, and controls a playback of the multimedia data and a method of driving the pattern code recognition multimedia playback apparatus.

BACKGROUND

The statements in this section merely provide background information related to the present disclosure and do not necessarily constitute prior art.

The state of the information technology market introduces sensors that adopt a variety of sensing technologies to provide a user with much educational or living assistance.

However, a conventional printed material recognition apparatus has trouble and inconvenience in a procedural aspect in which a recognition code embedded in a printed material cannot be recognized until the entire printed material (book) is printed.

Further, the conventional printed material recognition apparatus is unable to discern between the printed pattern coded content and separately printed non-encoded content of characters, figures or pictures, causing incorrect screen to be displayed from the codes read off the printed material or wild excerpts of content to be offered to confused viewers.

Moreover, in the conventional printed material recognition apparatus, a display operation from a recognized code is limited to an audio, causing a degradation of satisfaction of a user due to the limited display scheme.

For this reason, the inventor has noted that the conventional printed material recognition apparatus fails to satisfy purchase need and possession need of the user who wants to purchase a printed material recognition apparatus, causing a decrease of total revenue in the same field, which eventually affects companies of the same kind having a sensing technology as a leading pursuit and further affects the development of industry.

DISCLOSURE

Technical Problem

The present disclosure has been made in view of the above aspects, and it is an object of the present disclosure to easily call multimedia data stored in a memory pack attached to a pattern code recognition set-top box with a pattern code recognition pen that recognizes a pattern code printed on a pattern code-printed material and promptly and easily watch the multimedia data played through a display unit, by recognizing a pattern code by using the pattern code recognition pen, extracting multimedia data corresponding to the recognized pattern code, and controlling a playback of the multimedia data.

It is another object of the present disclosure to provide various curriculums including animation, storytelling, dancing, and the like, to allow infants or preschool children to easily access contents to learn described in studying materials through the display unit, thus improving learning efficiency of the infants or preschool children and assisting intelligence development, personality development, and emotion development.

It is further another object of the present disclosure to call multimedia data corresponding to a pattern code printed on a pattern code-printed material at any time through the pattern code recognition set-top box without printing a large volume of various printed materials, not only to positively induce a learning motivation of infants or preschool children who are not accustomed to selection of information, but also to save cost and time required to print various printed materials at a maximum.

It is further another object of the present disclosure to increase purchasing rate of a subscriber by satisfying a purchasing need of the subscriber who wants to learn useful information promptly and easily, and to contribute to an increase of revenue of a company and development of a related industry.

SUMMARY

According to some embodiments of the present disclosure, a pattern code recognition multimedia playback apparatus includes a pattern code-printed material on which a pattern code is printed, a pattern code recognition pen configured to recognize the pattern code printed on the pattern code-printed material and to output the pattern code to outside, and a pattern code recognition set-top box configured to receive the pattern code from the pattern code recognition pen, to extract multimedia data corresponding to the pattern code received from the pattern code recognition pen, and to output the multimedia data to a display unit.

Another embodiment of the present disclosure provides a method for driving a pattern code recognition multimedia playback apparatus. The method includes a first step including a pattern code recognition pen recognizing a first pattern code among pattern codes printed on a pattern code-printed material and transmitting the first pattern code to a pattern code recognition set-top box, a second step including the pattern code recognition set-top box identifying multimedia data or a command corresponding to the first pattern code received from the pattern code recognition pen, and a third step including the pattern code recognition set-top box outputting the multimedia data to a connected display unit or performing a process instructed by the command.

Advantageous Effects

According to some embodiments of the present disclosure, multimedia data stored in a memory pack attached to a pattern code recognition set-top box can be easily called with a pattern code recognition pen that recognizes a pattern code printed on a pattern code-printed material and the multimedia data played through a display unit can be promptly and easily watched, by recognizing a pattern code by using the pattern code recognition pen, extracting multimedia data corresponding to the recognized pattern code, and controlling a playback of the multimedia data.

Further, according to some embodiments of the present disclosure, various curriculums including animation, storytelling, dancing, and the like are provided, to allow infants or preschool children to easily access contents to learn described in studying materials through the display unit, thus improving learning efficiency of the infants or preschool children and assisting intelligence development, personality development, and emotion development.

Moreover, according to some embodiments of the present disclosure, multimedia data corresponding to a pattern code printed on a pattern code-printed material can be called at any time through the pattern code recognition set-top box without printing a large volume of various printed materials, thus not only positively inducing a learning motivation of infants or preschool children who are not accustomed to selection of information, but also saving cost and time required to print various printed materials at a maximum.

In addition, according to some embodiments of the present disclosure, purchasing rate of a subscriber can be increased by satisfying a purchasing need of the subscriber who wants to learn useful information promptly and easily, contributing to an increase of revenue of a company and development of a related industry.

REFERENCE NUMERALS

100: pattern code recognition multimedia playback apparatus
110: pattern code 120: pattern code-printed material
130: pattern code recognition pen 150: pattern code recognition set-top box
160: display unit

DETAILED DESCRIPTION

Hereinafter, at least one embodiment of the present disclosure will be described in detail with reference to the accompanying drawings.

In the following description, like reference numerals designate like elements although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via one or more additional components.

Figure 1:
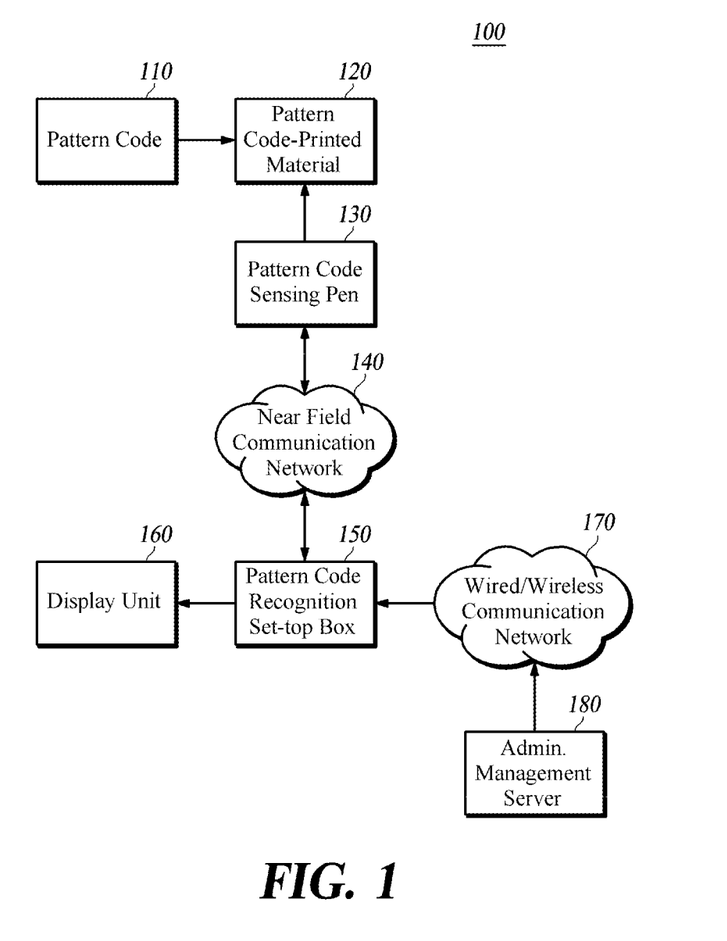
FIG. 1 is a block diagram of a pattern code recognition multimedia playback apparatus according to some embodiments of the present disclosure.

FIG. 1 is a block diagram of a pattern code recognition multimedia playback apparatus according to some embodiments of the present disclosure.

As shown in FIG. 1, a pattern code recognition multimedia playback apparatus 100 recognizes a pattern code 110 printed on a pattern code-printed material 120 by using a pattern code recognition pen 130, extracts multimedia data corresponding to the pattern code 110 received via a local area network 140 from a pattern code recognition set-top box 150, and plays the multimedia data on a display unit 160, including the pattern code 110 printed on the pattern code-printed material 120, the pattern code recognition pen 130, and the pattern code recognition set-top box 150.

In some embodiments, the pattern code recognition multimedia playback apparatus 100 further includes an operation management server 180 connected to the pattern code recognition set-top box 150 with a wired/wireless communication network 170.

The operation management server 180 can remotely check a device status of the pattern code recognition set-top box 150, and transmits large amount of information data to the pattern code recognition set-top box 150 as needed by an administrator.

The pattern code 110 includes a code obtained by normalizing a coordinate value or a command in a predetermined pattern. For example, when injecting an ink containing a carbon component on a pattern code-printed material, the pattern code is formed of a command recognition code having a predetermined pattern.

An ink with the carbon component excluded is injected on the pattern code-printed material 120 regardless of an order of printing the pattern code 110 on the pattern code-printed material 120, and a character, a figure, or a picture printed on the pattern code-printed material 120 by using the ink with the carbon component excluded is overprinted on the top or the bottom of the pattern code, and hence such a character, figure, or picture is visible to the naked eye.

The pattern code-printed material 120 can be easily manufactured with either one of paper material or rubber material, and can be published as any one of a general book, a learning book (learning subject: infant, child, youth, adult; learning contents: linguistic section, mathematical section, foreign language section, and the like), a fairy tale book, a comic book, a magazine, and a poster.

The pattern code-printed material 120 includes a first area and a second area.

The first area is a classified area for printing the pattern code 110 used for selecting a plurality of contents or a contents group that is a set of a plurality of contents, and at least one pattern code printed in the first area is linked to the multimedia data to be played.

The second area is a classified area for printing the pattern code 110 for controlling a playback of a plurality of contents, and at least one pattern code 110 is linked to a command for controlling a playback operation of the multimedia data.

Figure 3:
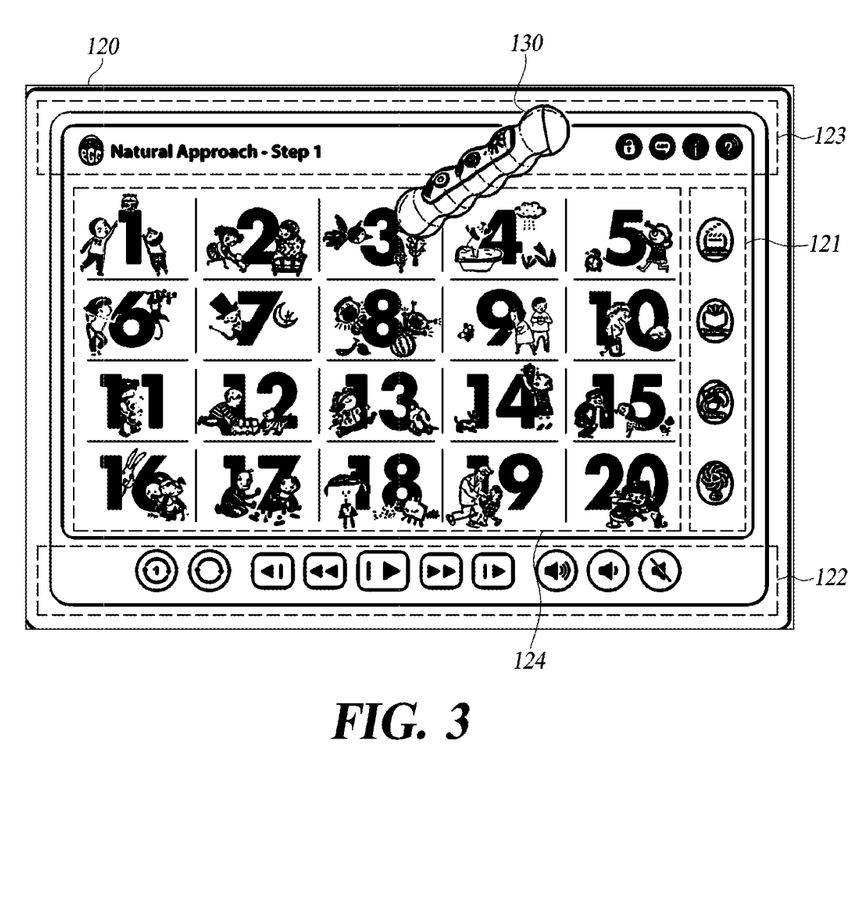
FIG. 3 is a schematic diagram of a pattern code-printed material included in a pattern code recognition multimedia playback apparatus according to some embodiments of the present disclosure.

As is clear from FIG. 3, the pattern code-printed material 120 includes the first area (not shown) including a first menu bar area 121 and a scenario area 124 and the second area (not shown) including a second menu bar area 122 and a third menu bar area 123.

The first menu bar area 121 is a detailed area a pattern code matching an animation executing function, a storytelling function, a dancing function, and at least one of the entire executing functions. The scenario area 124 is a detailed area schematically displaying a plurality of learning contents or a contents group.

The second menu bar area 122 is a detailed area including the pattern code 110 corresponding to at least one of a play start function, a backward function, a fast forward function, a volume control function, a mute function, a pause function, or a stop function, and the third menu bar area 123 is a detailed area including the pattern code 110 corresponding to at least one of a lock release function, a subtitle function, a device information providing function, or a help function.

The at least one pattern code 110 printed in the third menu bar area 123 is linked to a command corresponding to at least one of a device information display function, a subtitle display function, a device usage guide information display function, or a lock mode release function for the pattern code recognition set-top box 150.

Figure 2:
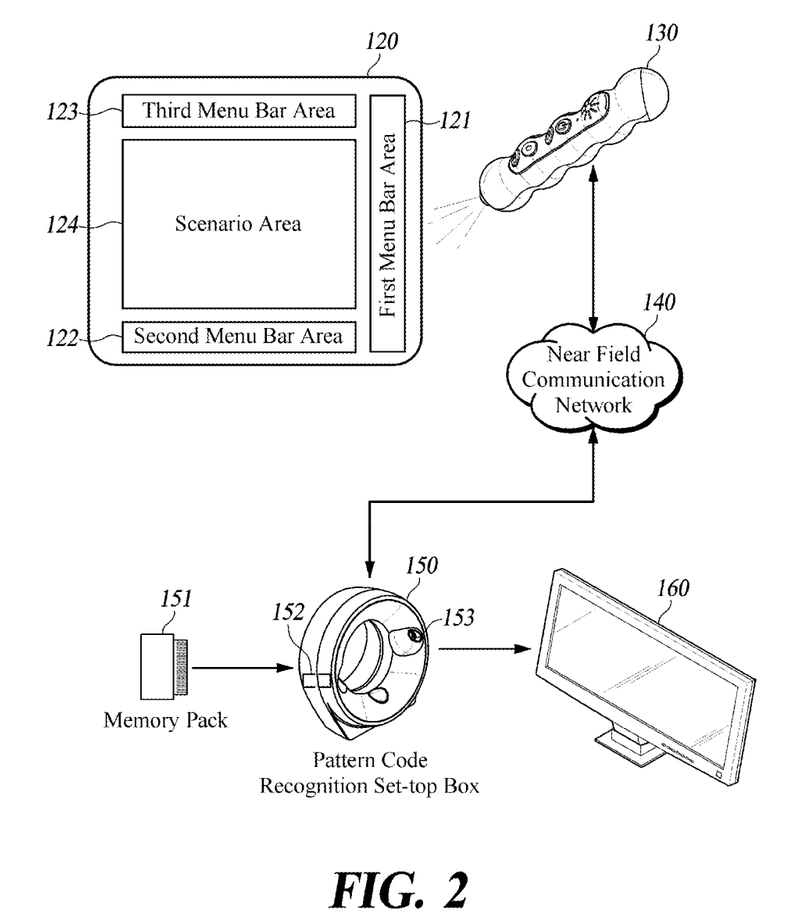
FIG. 2 is a schematic diagram of a pattern code recognition multimedia playback apparatus according to some embodiments of the present disclosure.

As shown in FIG. 2, the pattern code recognition pen 130 is a device for recognizing a pattern code and determining whether or not a property of data is an audio based on whether or not audio data corresponding to the recognized pattern code 110 are stored in a memory. When it is determined that the recognized pattern code 110 corresponds to the audio data, the pattern code recognition pen 130 plays the audio data, and when it fails to determine that the recognized pattern code 110 corresponds to the audio data, the pattern code recognition pen 130 transmits the recognized pattern code to the pattern code recognition set-top box 150 that is connected to the local area network 140.

In other words, the pattern code recognition pen 130 determines a property of the data indicating the recognized pattern code 110, when it is determined that the property of the data is an audio, extracts the audio data corresponding to the recognized pattern code 110 from the memory included in the pattern code recognition pen 130 and plays the audio data, and when it is determined that the property of the data is not an audio, transmits the recognized pattern code 110 to the pattern code recognition set-top box 150.

Figure 4:
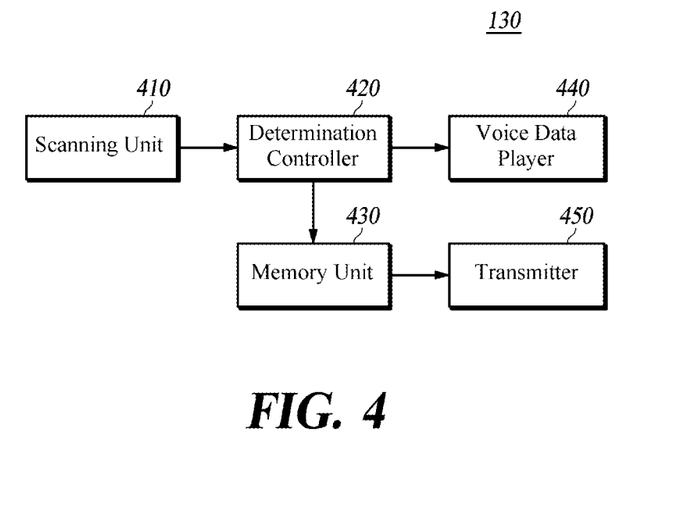
FIG. 4 is a block diagram of a pattern code sensing pen included in the pattern code recognition multimedia playback apparatus according to some embodiments of the present disclosure.

As shown in FIG. 4, the pattern code recognition pen 130 includes a recognizing unit 410, a determination controller 420, a memory 430, an audio data playing unit 440, and a transmitting unit 450.

The recognition unit 410 of the pattern code recognition pen 130 recognizes the pattern code 110 printed on the pattern code-printed material 120, and the determination controller 420 determines whether or not the audio data corresponding to the recognized pattern code 110 are stored in the memory 430.

The memory 430 stores therein the audio data corresponding to the recognized pattern code 110, and the audio data playing unit 440 extracts the audio data corresponding to the pattern code 110 from the memory 430, and plays the audio data.

When the determination controller 420 fails to determined that the recognized pattern code 110 is the audio data, the transmitting unit 450 transmits the recognized pattern code to outside.

The pattern code recognition set-top box 150 extracts the multimedia data corresponding to the recognized pattern code 110 received from the pattern code recognition pen 130 from the memory, and then outputs the multimedia data to the display unit 160.

Further, the pattern code recognition set-top box 150 refers to the memory with the pattern code 110, extracts any one of an animation play command, a storytelling movie play command, and a dancing movie play command, and then controls a playback operation of an animation, a storytelling movie, or a dancing movie.

The pattern code recognition set-top box 150 refers to the memory with the pattern code 110, extracts an operation control command, and then controls a playback of the multimedia data by using the operation control command, such as play start, backward, fast forward, volume control, mute, pause, and stop.

The pattern code recognition set-top box 150 refers to the memory with the pattern code 110, extracts a lock release command, and then releases a lock of the multimedia data in a lock state by using the lock release command.

The pattern code recognition set-top box 150 refers to the memory with the pattern code 110, extracts other operation control command, and then controls operations of the multimedia data by using the operation control command, such as subtitle display, device information display, and help display.

For another example, when the pattern code recognition set-top box 150 does not receive another pattern code for a predetermined time, the pattern code recognition set-top box 150 executes an auto-lock such that a state of playing multimedia data corresponding to any one of a plurality of learning contents is maintained.

In other words, when no pattern code is received for a predetermined time after receiving the pattern code 110 from the pattern code recognition pen 130, the pattern code recognition set-top box 150 switches its driving mode to a lock mode. The lock mode defines a state in which the pattern code recognition set-top box 150 does not perform a process corresponding to a signal received from the pattern code recognition pen.

When the pattern code recognition set-top box 150 receives another pattern code before the predetermined time elapses, the pattern code recognition set-top box 150 controls a playback operation of another multimedia data corresponding to any one of a plurality of learning contents.

Further, when the operation mode is not the lock mode, the pattern code recognition set-top box 150 displays an icon or a character for identifying multimedia data or a command corresponding to the pattern code received from the pattern code recognition pen on a part of a screen of the display unit 160.

The pattern code recognition set-top box 150 displays a notification message notifying a playback of another multimedia data on a part of a screen of the connected display unit 160.

A memory pack 151 is attached to the pattern code recognition set-top box 150 in a removable manner, and the pattern code recognition set-top box 150 refers to the memory pack 151 with the recognized pattern code 110, and extracts multimedia data stored in the memory pack 151.

The pattern code recognition set-top box 150 includes a connection port 152 for attaching the memory pack 151 in a removable manner, and when the memory pack 151 is attached to the connection port 152, confirms a product serial number of the memory pack 151, and performs a usage authentication for the memory pack 151.

The pattern code recognition set-top box 150 includes a connection terminal 153 on one side thereof, which allows a contact with a charge terminal (not shown) included in the pattern code recognition pen 130, and when the charge terminal (not shown) of the pattern code recognition pen 130 is brought into contact with the connection terminal 153, a power supply that supplies required power to the pattern code recognition set-top box 150 supplies charging power connected to the connection terminal 153, to assist charging of the pattern code recognition pen 130.

The pattern code recognition pen 130 includes a cover (not shown) that is rotatable to expose or cover the charge terminal (not shown), prevents the charge terminal (not shown) from being exposed by rotating the cover (not shown) when not charging the pattern code recognition pen 130, and allows the charge terminal (not shown) to be exposed to outside by reversely rotating the cover when charging the pattern code recognition pen 130.

Figure 5:
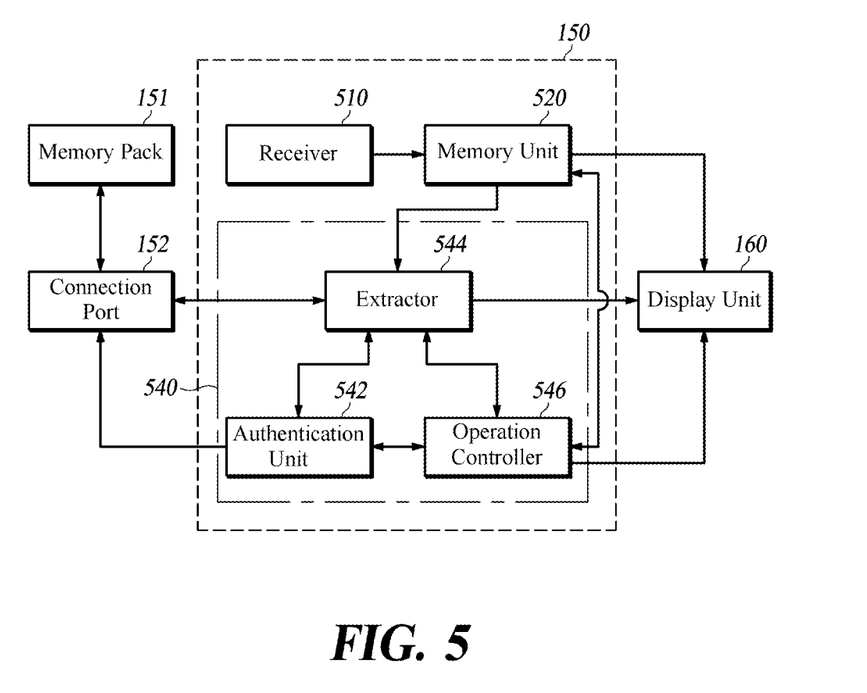
FIG. 5 is a block diagram of a pattern code recognition set-top box included in the pattern code recognition multimedia playback apparatus according to some embodiments of the present disclosure.

As shown in FIG. 5, the pattern code recognition set-top box 150 includes a receiving unit 510, a memory 520, and a controller 540, and the controller 540 includes a usage authentication unit 542, an extracting unit 544, and an operation controller 546.

The receiving unit 510 receives the pattern code 110 from the pattern code recognition pen 130, and the memory 520 stores therein multimedia data or a command corresponding to the pattern code for each pattern code.

The memory 520 can be an external type or an internal type, and when the memory 520 is an external type, the memory 520 includes the memory pack 151 that is attached to the connection port 152 located on one side of the pattern code recognition set-top box 150 in a removable manner.

When the memory pack 151 is attached to the connection port 152, the usage authentication unit 542 of the controller 540 confirms a product serial number of the memory pack 151, performs a usage authentication for the memory pack 151, and the extracting unit 544 extracts multimedia data or a command corresponding to the pattern code received via the receiving unit 510 from the memory 520.

The operation controller 546 performs a control to output the multimedia data to the display unit 160 or a control to perform an operation indicated by the command.

Figure 6:
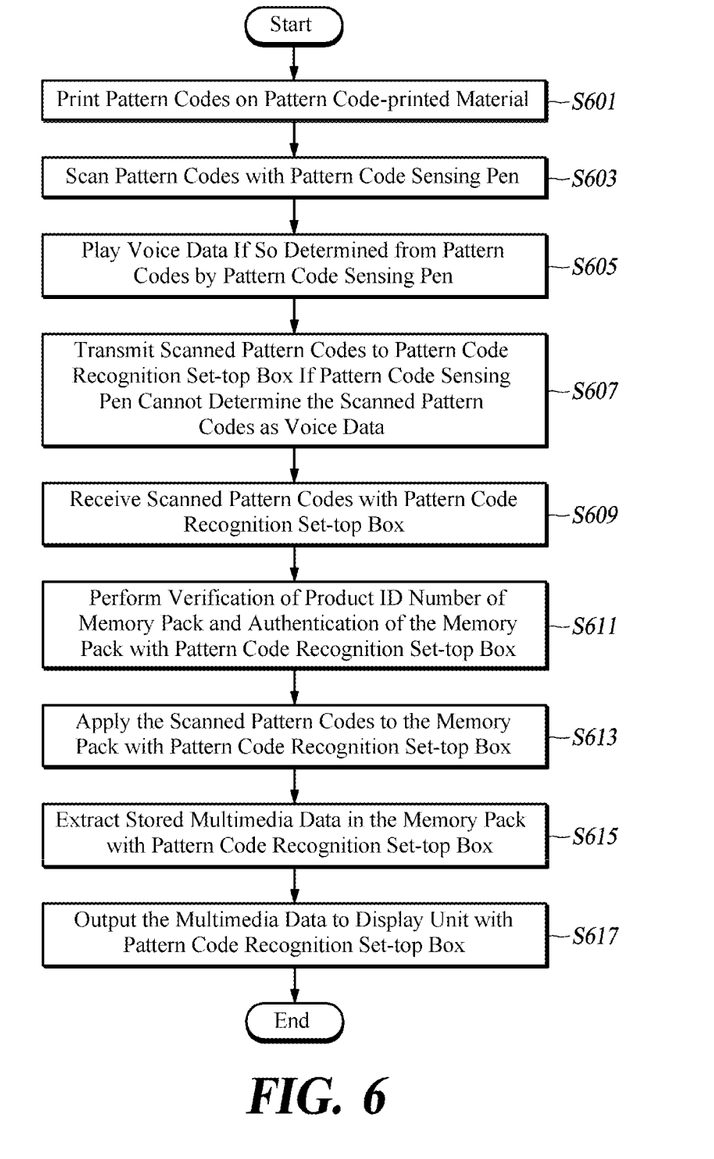
FIG. 6 is a flowchart of a method of driving the pattern code recognition multimedia playback apparatus according to some embodiments of the present disclosure.

FIG. 6 is a flowchart of a method for driving the pattern code recognition multimedia playback apparatus according to some embodiments of the present disclosure.

The method for driving the pattern code recognition multimedia playback apparatus shown in FIG. 6 includes recognizing pattern code 110 by using the pattern code recognition pen 130, extracting multimedia data corresponding to the pattern code from the pattern code recognition set-top box 150, and controlling a playback operation of the multimedia data.

The pattern code recognition pen 130 recognizes the pattern code 110 printed on the pattern code-printed material 120 (Steps S601 and S603).

When it is determined that the recognized pattern code 110 is audio data, the pattern code recognition pen 130 plays the audio data (Step S605), and when it fails to determine that the recognized pattern code 110 is audio data, the pattern code recognition pen 130 transmits the recognized pattern code 110 to the pattern code recognition set-top box 150 that is connected to the local area network 140 (Step S607).

Detailed operations in a transmission step are implemented as follows.

The pattern code recognition pen 130 determines the property of data indicating the pattern code 110, and when it is determined that the property of the data is an audio, extracts audio data corresponding to the pattern code 110 from the memory 430 included in the pattern code recognition pen 130, and plays the audio data. When the property of the data is not the audio, the pattern code recognition pen 130 transmits the pattern code to the pattern code recognition set-top box 150.

The pattern code recognition set-top box 150 receives the pattern code 110 from the pattern code recognition pen 130 (Step S609).

The pattern code recognition set-top box 150 confirms a product serial number of the attached memory pack 151, and performs a usage authentication for the memory pack 151 (Step S611).

The pattern code recognition set-top box 150 refers to the memory pack 151 with the recognized pattern code 110 (Step S613) and extracts multimedia data or a command stored in the memory pack 151 (Step S615) after the step of identifying the multimedia data or the command corresponding to the pattern code 110.

Detailed operations in a step of identifying the multimedia data or the command are implemented as follows.

The pattern code recognition set-top box 150 confirms a product serial number of the memory pack 151 that is attached in a removable manner, performs an authentication for the memory pack 151, and accesses the memory pack 151 and identifies the multimedia data or the command corresponding to the pattern code 110 only when the authentication is successful.

Operations subsequent to the pattern code recognition set-top box 150 receiving the pattern code 110 from the pattern code recognition pen 130 are performed as follows.

The pattern code recognition set-top box 150 refers to the memory 520 with the pattern code 110, extracts any one of an animation play command, storytelling movie play command, and a dancing movie play command, and controls a playback operation of an animation, a storytelling movie, or a dancing movie by using the corresponding command.

The pattern code recognition set-top box 150 refers to the memory 520 with the pattern code 110, extracts a first operation control command and a second operation control command, and controls a playback operation of the multimedia data by using the first operation control command, such as play start, backward, fast forward, volume control, mute, pause, and stop or controls an operation of the multimedia data by using the second operation control command, such as subtitle display, device information display, and help display.

The pattern code recognition set-top box 150 refers to the memory 520 with the pattern code 110, extract a lock release command, and then releases a lock of the multimedia data being played in a lock state by using the lock release command Lastly, the pattern code recognition set-top box 150 extracts the multimedia data corresponding to the pattern code 110, and outputs the multimedia data to the display unit 160 (Step S617).

Upon extracting the command corresponding to the pattern code 110, the pattern code recognition set-top box 150 performs a process instructed by the command.

In the method of driving the pattern code recognition multimedia playback apparatus, an additional operation is further performed as follows.

When the pattern code recognition set-top box 150 does not receive another pattern code for a predetermined time, the pattern code recognition set-top box 150 performs an auto-lock such that a state of playing the multimedia data is maintained, and upon receiving another pattern code before the predetermined time elapses, controls a playback operation of other multimedia data corresponding to any one of a plurality of learning contents.

In other words, when another pattern code is not received within the predetermined time after receiving the pattern code 110, the pattern code recognition set-top box 150 switches its driving mode to a lock mode. The lock mode defines a state in which the pattern code recognition set-top box 150 does not perform a process corresponding to a signal received from the pattern code recognition pen 130.

After the driving mode of the pattern code recognition set-top box 150 is switched to the lock mode, when other pattern code recognized from the pattern code-printed material 120 by the pattern code recognition pen 130 is received, the lock mode is switched to a lock release mode. In this case, the other pattern code can be a pattern code linked to a command for instructing a release of the lock mode.

The pattern code recognition set-top box 150 displays a notification message notifying a playback of other multimedia data on a part of a screen of the connected display unit 160.

In the description above, although all of the components of the embodiments of the present disclosure may have been explained as assembled or operatively connected as a unit, one of ordinary skill would understand the present disclosure is not limited to such embodiments. Rather, within some embodiments of the present disclosure, the respective components are selectively and operatively combined in any number of ways. Every one of the components are capable of being implemented alone in hardware or combined in part or as a whole and implemented in a computer program having program modules residing in computer readable media and causing a processor or microprocessor to execute functions of the hardware equivalents. Codes or code segments to constitute such a program are understood by a person skilled in the art. The computer program is stored in a non-transitory computer readable media, which in operation realizes the embodiments of the present disclosure. The computer readable media includes magnetic recording media, optical recording media or carrier wave media, in some embodiments.

In addition, one of ordinary skill would understand terms like 'include', 'comprise', and 'have' to be interpreted in default as inclusive or open rather than exclusive or closed unless expressly defined to the contrary. All the terms that are technical, scientific or otherwise agree with the meanings as understood by a person skilled in the art unless defined to the contrary. One of ordinary skill would understand common terms as found in dictionaries are interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from the idea and scope of the claimed invention. Specific terms used in this disclosure and drawings are used for illustrative purposes and not to be considered as limitations of the present disclosure. Accordingly, one of ordinary skill would understand the scope of the claimed invention is not to be limited by the explicitly described above embodiments but by the claims and equivalents thereof.

CROSS-REFERENCE TO RELATED APPLICATION

If applicable, this application claims priority under 35 U.S.C § 119(a) of Patent Application No. 10-2012-0122627, filed on Oct. 31, 2012 in Korea, the entire content of which is incorporated herein by reference. In addition, this non-provisional application claims priority in countries, other than the U.S., with the same reason based on the Korean patent application, the entire content of which is hereby incorporated by reference.

The invention claimed is:

1. A pattern code recognition multimedia playback-system, comprising:
    a pattern code-printed material on which a pattern code is printed;
    a pattern code recognition pen for recognizing the pattern code printed on the pattern code-printed material; and
    a pattern code recognition set-top box for:
        receiving the pattern code from the pattern code recognition pen,
        extracting multimedia data corresponding to the pattern code received from the pattern code recognition pen, and
        outputting the multimedia data to a display unit;
    wherein the pattern code recognition set-top box switches an operation mode of the pattern code recognition set-top box to a lock mode when the pattern code recognition set-top box does not receive another pattern code for a predetermined time after receiving the pattern code;
    wherein the lock mode defines a state in which the pattern code recognition set-top box does not perform a process corresponding to a signal received from the pattern code recognition pen, but continues outputting the multimedia data to the display unit such that in the lock mode the multimedia data continues to be displayed by the display unit; and
    wherein the pattern code recognition set-top top box deactivates the lock mode when a receiver of the pattern code recognition set-top box receives a second pattern code including a predetermined lock release command from the pattern code recognition pen.

2. The pattern code recognition multimedia playback system according to claim 1, wherein the pattern code recognition pen determines a property of data indicating the pattern code,
    extracts, when it is determined that the property of the data is an audio, audio data corresponding to the pattern code from a memory included in the pattern code recognition pen and playback the audio data, and
    transmits, when it is determined that the property of the data is not an audio, the pattern code to the pattern code recognition set-top box.

3. The pattern code recognition multimedia playback system according to claim 2, wherein the pattern code recognition pen determines whether or not the property of the data is an audio based on whether or not the audio data corresponding to the pattern code is stored in the memory.

4. The pattern code recognition multimedia playback system according to claim 1, wherein the pattern code includes a code obtained by normalizing a coordinate value or a command in a predetermined pattern.

5. The pattern code recognition multimedia playback system according to claim 1, wherein the pattern code-printed material includes a printed character, figure, or picture on a bottom or a top of the pattern code and is configured to visibly display the character, figure, or picture.

6. The pattern code recognition multimedia playback system according to claim 1, wherein the pattern code recognition set-top box comprises:
    a receiver for receiving the pattern code from the pattern code recognition pen, a memory for storing multimedia data or a command corresponding to the pattern code for each pattern code, and a controller for extracting multimedia data or a command corresponding to the pattern code received by the receiver from the memory, and outputting the multimedia data to the display unit or to control the pattern code recognition set-top box to perform an operation instructed by the command.

7. The pattern code recognition multimedia playback system according to claim 6, wherein the memory comprises:

a memory pack for being removably attached to a connection port located on one side of the pattern code recognition set-top box.

8. The pattern code recognition multimedia playback system according to claim 7, wherein the controller is configured, when the memory pack is attached to the connection port, confirms a product serial number of the memory pack thus performing an authentication of the memory pack.

9. The pattern code recognition multimedia playback system according to claim 1, wherein the pattern code-printed material includes a first area and a second area, at least one pattern code printed in the first area is linked to the multimedia data to be played, and at least one pattern code printed in the second area is linked to a command for controlling an operation of playing back the multimedia data.

10. The pattern code recognition multimedia playback system according to claim 1, wherein the pattern code-printed material includes a third area, and at least one pattern code printed in the third area is linked to a command corresponding to at least one of a device information display function, a subtitle display function, a device usage guide information display function, or a pattern code recognition set-top box lock mode release function.

11. The pattern code recognition multimedia playback system according to claim 1, wherein the pattern code recognition set-top box, when the pattern code recognition set-top box is not in the lock mode, displays an icon or a character for identifying multimedia data or a command corresponding to the first pattern code on a part of a screen of the display unit.

12. A method of driving a pattern code recognition multimedia playback apparatus, the method comprising:

a first step including a pattern code recognition pen recognizing a first pattern code among pattern codes printed on a pattern code-printed material and transmitting the first pattern code to a pattern code recognition set-top box;

a second step including the pattern code recognition set-top box identifying multimedia data or a command corresponding to the first pattern code received from the pattern code recognition pen;

a third step including the pattern code recognition set-top box outputting the multimedia data to a connected display unit or performing a process instructed by the command; and a fourth step including the pattern code recognition set-top box switching, when the pattern code recognition set-top box does not receive a second pattern code for a predetermined time after receiving the first pattern code, an operation mode of the pattern code recognition set-top box to a lock mode, wherein the lock mode defines a state in which the pattern code recognition set-top box does not perform a process corresponding to a signal received from the pattern code recognition pen, but continues outputting the multimedia data to the display unit such that in the lock mode the multimedia data continues to be displayed by the display unit; and wherein the pattern code recognition set-top box deactivates the lock mode when a receiver of the pattern code recognition set-top box receives a second pattern code including a predetermined lock release command from the pattern code recognition pen.

13. The method according to claim 12, wherein the transmitting in the first step includes determining a property of data indicating the first pattern code, extracting, when it is determined that the property of the data is an audio, audio data corresponding to the first pattern code from a memory included in the pattern code recognition pen and playing back the audio data, and transmitting, when it is determined that the property of the data is not an audio, the pattern code to the first pattern code recognition set-top box.

14. The method according to claim 12, wherein the identifying in the second step includes confirming a product serial number of a memory pack removably attached to a connection port located on one side of the pattern code recognition set-top box thus performing an authentication of the memory pack, and accessing the memory pack and identifying the multimedia data or the command corresponding to the first pattern code only when the authentication is successful.

15. The method according to claim 12, further comprising switching, when the pattern code recognition set-top box receives a third pattern code recognized from the pattern code-printed material by the pattern code recognition pen after the operation mode of the pattern code recognition set-top box is switched to the lock mode, the lock mode to a lock release mode, wherein the third pattern code includes a pattern code linked to a command for instructing a release of the lock mode.

16. A pattern code recognition multimedia playback system comprising:

a pattern code recognition pen for recognizing printed pattern codes; a pattern code recognition set-top box including:

a receiver that receives pattern codes from the pattern code recognition pen;

an extractor that extracts multimedia data corresponding to received printed pattern codes; and an operator controller that outputs the multimedia data to a display unit;

wherein:

the pattern code recognition set-top box activates a lock mode when, after receiving a first pattern code from the pattern code recognition pen, a second pattern code from the pattern code recognition pen is not received by the receiver for a predetermined period of time;

the pattern code recognition set-top box deactivates the lock mode when the receiver receives the second pattern code including a predetermined lock release command; and in the lock mode, the pattern code recognition set-top box does not perform a process corresponding to a signal received from the pattern code recognition pen without receiving the lock release command from the pattern code recognition pen, but continues outputting the multimedia data to the display unit such that in the lock mode the multimedia data continues to be displayed by the display unit.

* * * * *